(12) United States Patent
Aliane et al.

(10) Patent No.: US 11,047,738 B2
(45) Date of Patent: Jun. 29, 2021

(54) SUSPENDED-MEMBRANE THERMAL DETECTOR COMPRISING A DEFORMABLE PART FOR THERMAL SHORT-CIRCUIT

(71) Applicant: Commissariat A L'Energie Atomique et aux Energies Alternatives, Paris (FR)

(72) Inventors: Abdelkader Aliane, Grenoble (FR); Jean-Louis Ouvrier-Buffet, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 34 days.

(21) Appl. No.: 16/697,594

(22) Filed: Nov. 27, 2019

(65) Prior Publication Data

US 2020/0173858 A1 Jun. 4, 2020

(30) Foreign Application Priority Data

Nov. 30, 2018 (FR) .................................... 18 72140

(51) Int. Cl.
*G01J 5/10* (2006.01)
*G01J 5/04* (2006.01)
*G01J 5/02* (2006.01)

(52) U.S. Cl.
CPC ............. *G01J 5/046* (2013.01); *G01J 5/0215* (2013.01); *G01J 5/10* (2013.01)

(58) Field of Classification Search
CPC .......... G01J 5/046; G01J 5/0215; G01J 5/061; G01J 5/0853; G01J 5/10
See application file for complete search history.

(56) References Cited

U.S. PATENT DOCUMENTS

| 7,241,998 | B2 * | 7/2007 | Vilain | ........................ | G01J 5/02 |
| | | | | | 250/338.1 |
| 2002/0179837 | A1 * | 12/2002 | Ray | ............................ | G01J 5/20 |
| | | | | | 250/338.1 |
| 2018/0299329 | A1 | 10/2018 | Masini et al. | | |
| 2019/0107442 | A1 | 4/2019 | Masini et al. | | |

FOREIGN PATENT DOCUMENTS

| KR | 10-1181248 B1 | 9/2012 | |
| KR | 101442811 B1 * | 9/2014 | ................ G01J 5/20 |

OTHER PUBLICATIONS

French Preliminary Search Report dated Oct. 17, 2019 in French Application 18 72140 filed on Nov. 30, 2018 (with English Translation of Categories of Cited Documents & Written Opinion), 9 pages.
Choudhary, N, et al., "Shape memory alloy thin films and heterostructures for MEMS applications: A review", Sensors and Actuators A: Physical, 2016, pp. 162-181.

* cited by examiner

*Primary Examiner* — David P Porta
*Assistant Examiner* — Fani Boosalis
(74) *Attorney, Agent, or Firm* — Oblon, McClelland, Maier & Neustadt, L.L.P.

(57) ABSTRACT

A thermal detector including a substrate, an absorbent membrane including a fixed part and a deformable part, the latter including a shape-memory alloy, and being arranged with respect to the substrate in such a way that its free end is in contact with the substrate at the contact temperature $T_c$ above the austenite start temperature $A_s$.

9 Claims, 10 Drawing Sheets

SUSPENDED-MEMBRANE THERMAL DETECTOR COMPRISING A DEFORMABLE PART FOR THERMAL SHORT-CIRCUIT

TECHNICAL FIELD

The field of the invention is that of thermal detectors of electromagnetic radiation, for example infrared or terahertz, comprising a suspended absorbent membrane thermally insulated from the substrate. The invention applies notably to the field of infrared or terahertz imaging, thermography, or the detection of persons or of movement.

PRIOR ART

Devices for detecting electromagnetic radiation may comprise a matrix of sensitive pixels each containing a thermal detector comprising an absorbent membrane thermally insulated from the reading substrate. The absorbent membrane comprises an absorber of the electromagnetic radiation to be detected associated with a thermometric transducer, an electrical property of which varies in intensity as a function of heating of the transducer. The thermometric transducer may be a thermistor material such as a vanadium oxide or amorphous silicon, among others.

However, as the temperature of the thermometric transducer largely depends on its environment, the absorbent membrane is insulated thermally from the substrate and the reading circuit, the latter preferably being arranged in the substrate. Thus, the absorbent membrane is generally suspended above the substrate by anchoring pillars, and is thermally insulated therefrom by heat-insulating arms. These anchoring pillars and heat-insulating arms also have an electrical function, providing electrical connection of the absorbent membrane to the reading circuit.

However, the thermal detector is liable to be subjected to high-power electromagnetic radiation, such as solar radiation or laser radiation. As the absorbent membrane is thermally insulated from the substrate, it may then undergo strong heating, likely to cause degradation of the properties of the thermometric transducer.

Figure 1A:
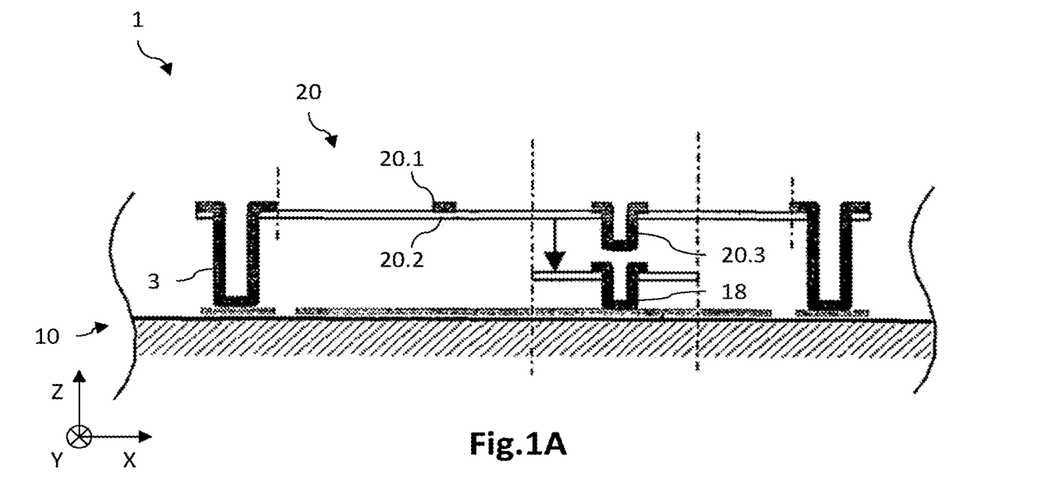
FIGS. 1A and 1B, already described above, are schematic views, in section (FIG. 1A) and in perspective (FIG. 1B), of a thermal detector according to two examples of the prior art.

In this connection, FIG. 1A is a schematic sectional view of a thermal detector described in application WO2003/002963. The absorbent membrane 20 is suspended above the substrate 10 by anchoring pillars 3 and heat-insulating arms (not shown). It is adapted to deform under the effect of heating until it comes into contact with the substrate 10. This contact causes cooling of the absorbent membrane 20, thus making it possible to prevent the temperature of the absorbent membrane 20 reaching a value starting from which degradation of the properties of the thermometric transducer may take place.

For this, the absorbent membrane 20 comprises two superposed parts 20.1 and 20.2 that are made in such a way that part 20.1 has a coefficient of thermal expansion different from that of part 20.2. Moreover, the absorbent membrane 20 comprises a protuberance 20.3 arranged projecting with respect to the XY plane of the absorbent membrane 20 and oriented towards the substrate 10. Moreover, the substrate 10 comprises a contact pad 18 extending along the Z axis. Thus, when the absorbent membrane 20 is heated excessively, the two superposed parts 20.1 and 20.2 expand differently (bimetal effect), which causes deformation of the absorbent membrane 20 and therefore a decrease in the spacing between the protuberance 20.3 and the contact pad 18 until there is mechanical contact between these two elements. The absorbent membrane 20 is then cooled, which consequently causes spacing of the protuberance 20.3 with respect to the contact pad 18. However, it appears that a continuous movement of vertical oscillation may develop owing to alternation of the phases of cooling in contact with the substrate 10 and of heating after loss of contact.

Figure 1B:
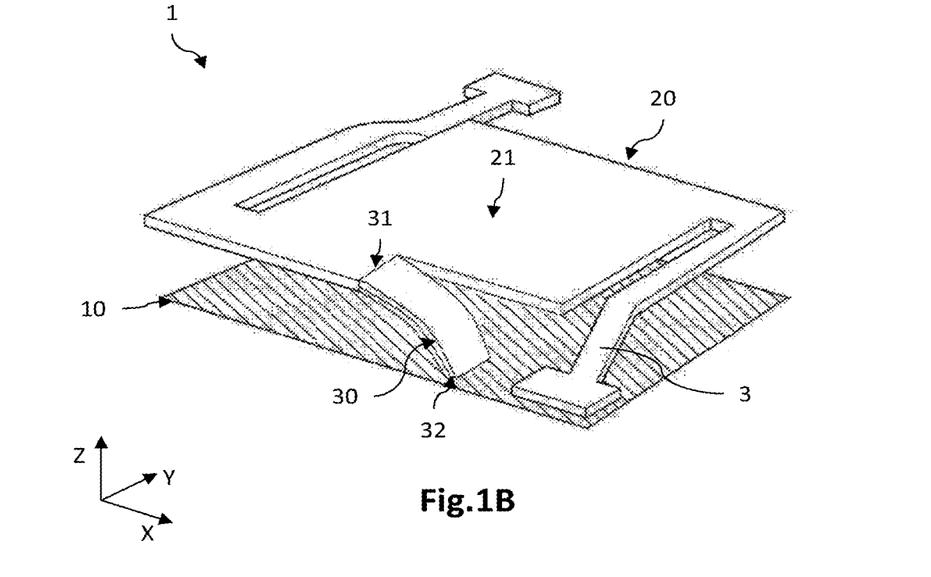

FIG. 1B is a schematic perspective view of the thermal detector described in the application KR101181248. The absorbent membrane 20 comprises a fixed detecting part 21 at the level of which a thermistor material is arranged, and a deformable part 30 of the bimetal type. It has a first end 31 fixed to the detecting part 21 and an opposite free second end 32, i.e. the second end 32 is movable in displacement along the Z axis under the effect of deformation of the deformable part 30. Operation is similar to that described above: on being heated excessively, the deformable part 30 deforms by the bimetal effect so that the free end 32 comes into contact with the substrate 10, which causes cooling of the absorbent membrane 20. However, a continuous movement of vertical oscillation may also be present, which impairs the quality of the thermal contact between the free end 32 and the substrate 10, and therefore the cooling of the absorbent membrane 20. This oscillating movement may also lead to degradation of the performance of the thermal detector 1.

PRESENTATION OF THE INVENTION

The invention aims to overcome the drawbacks of the prior art at least partly, and more particularly to propose a thermal detector having improved protection with respect to high-power electromagnetic radiation.

For this purpose, the invention relates to a thermal detector adapted to detect electromagnetic radiation, comprising:
  a substrate;
  a membrane that absorbs electromagnetic radiation, thermally insulated with respect to the substrate, and comprising:
    a fixed detecting part comprising a thermometric transducer,
    a deformable thermal short-circuit part,
      comprising a fixed end assembled to the fixed detecting part, and an opposite free end,
      adapted to deform under the effect of a temperature change of the absorbent membrane, so that the free end of the deformable part comes into contact with the substrate at a contact temperature $T_c$ of the absorbent membrane.
  According to the invention, the deformable part:
  comprises a shape-memory alloy having an inverse martensitic transformation of a martensitic phase into an austenitic phase of said alloy between initial $A_s$ and final $A_f$ austenitic temperatures, and a direct martensitic transformation of the austenitic phase into the martensitic phase between initial $M_s$ and final $M_f$ martensitic temperatures, the austenite finish temperature $A_f$ being above the martensite start temperature $M_s$, and
  is arranged with respect to the substrate in such a way that the free end is in contact with the substrate at the contact temperature $T_c$ above the austenite start temperature $A_s$.

Certain preferred but non-limiting aspects of this thermal detector are as follows.

The deformable part may have a maximum travel $\Delta p_{max}$ between a first position $p_r$ of the free end for a temperature $T_m$ of the absorbent membrane less than or equal to the martensite finish temperature $M_f$, and a second position $p_{d,max}$ of the free end corresponding to a temperature $T_m$ greater than or equal to the austenite finish temperature $A_f$.

It may then be positioned with respect to the substrate in such a way that a maximum distance $d_{max}$ separating the free end occupying the first position $p_r$ and a contact surface of the substrate on which the free end is in contact at the contact temperature $T_c$ is less than or equal to the maximum travel $\Delta p_{max}$.

The shape-memory alloy may be a metal alloy based on NiTi.

The shape-memory alloy may be a metal alloy selected from $Ti_{50.5}Ni_{24.5}Pd_{25}$, $Ti_{85.3-x}Ni_xHf_{14.7}$ with x>50 at %, and $Ti_7Ni_{11}Zr_{43}Cu_{39-x}Co_x$ with x>10 at %.

The substrate may have a contact surface on which the free end is in contact at the contact temperature $T_c$, and in which the shape-memory alloy is in the form of a longitudinal strip between the fixed end and the free end, one face of which, oriented towards the contact surface of the substrate, having projecting features.

The substrate may have a flat upper face, and may comprise a contact pad that extends from the upper face and has a contact surface on which the free end is in contact at the contact temperature $T_c$.

The substrate may have a flat upper face, and the absorbent membrane may be held above the upper face of the substrate by heat-insulating arms, and by anchoring pillars that extend approximately orthogonally to the plane of the upper face of the substrate.

The contact pad may be made of at least one heat-conducting material identical to that of the anchoring pillars.

The invention also relates to a method for fabricating the thermal detector according to any one of the preceding features, comprising the following steps:
supplying a substrate having a so-called contact surface;
depositing at least one sacrificial layer;
making anchoring pillars through the sacrificial layer;
making heat-insulating arms and an absorbent membrane on the sacrificial layer, the absorbent membrane comprising a deformable part located opposite the contact surface;
removing the sacrificial layer.

BRIEF DESCRIPTION OF THE DRAWINGS

Other aspects, aims, advantages and features of the invention will become clearer on reading the following detailed description of preferred embodiments of the latter, given as non-limiting examples, and made with reference to the appended drawings, in which.

DETAILED DISCLOSURE OF PARTICULAR EMBODIMENTS

In the figures and in the rest of the description, the same references represent identical or similar elements. Moreover, the various elements are not shown to scale, for clarity of the figures. Moreover, the different embodiments and variants are not exclusive of one another and may be combined with one another. Unless stated otherwise, the terms "approximately", "about", "of" the order of signify to within 10%, and preferably to within 5%. Moreover, the expression "comprising a" is to be understood, unless stated otherwise, as "comprising at least one" and not as "comprising a single".

The invention relates to a device for detecting electromagnetic radiation, for example infrared or terahertz radiation. The detecting device comprises one or more thermal detectors preferably particularly suitable for detecting infrared radiation of the LWIR (Long Wavelength Infrared) range, whose wavelength is between about 8 μm and 14 μm. Each thermal detector advantageously comprises a quarter-wave interference cavity formed between an absorbent membrane and a reflector, thus making it possible to maximize the absorption of the infrared radiation to be detected by the absorbent membrane.

As described in detail hereunder, the thermal detector comprises an absorbent membrane suspended above a substrate by anchoring pillars and thermally insulated from the latter by heat-insulating arms. The absorbent membrane comprises a fixed detecting part comprising the thermometric transducer, and a deformable thermal short-circuit part, which comprises a free end intended to be in contact with the substrate when the absorbent membrane reaches a so-called contact temperature $T_c$ below a predetermined protection temperature $T_{th}$. Contact between the deformable part and the substrate makes it possible to cool the absorbent membrane, and therefore prevent the temperature $T_m$ of the latter reaching or even exceeding the protection temperature $T_{th}$ of the thermometric transducer. In the rest of the description, the temperature $T_m$ of the absorbent membrane is an average temperature of the various parts of the absorbent membrane. It is assumed to be uniform, to a first approximation, within the absorbent membrane, i.e. both in the fixed detecting part and in the deformable thermal short-circuit part.

The deformable thermal short-circuit part is made of at least one shape-memory alloy (SMA), i.e. an alloy having a martensitic transformation. In a known manner, and as described notably in the article by Choudhary and Kaur titled *Shape memory alloy thin films and heterostructures for MEMS applications: A review*, Sensors and Actuators A 242 (2016) 162-181, a martensitic transformation is a structural transition of the alloy, reversible and of the displacive type, as a function of temperature, between a martensitic phase (low-temperature crystallographic phase) and an austenitic phase (high-temperature crystallographic phase). The martensitic transformation has characteristic temperatures (at zero stress) that depend on the direction of the transformation. Thus, for the direct transformation (from austenite to martensite), the start and finish temperatures of transformation are conventionally designated $M_s$ (for martensite start temperature) and $M_f$ (for martensite finish temperature). For the inverse transformation (from martensite to austenite), the start and finish temperatures of transformation are conventionally designated $A_s$ (for austenite start temperature) and $A_f$ (for austenite finish temperature). Also in a known manner, the martensitic transformation has a temperature hysteresis between cooling and heating of the alloy, since the temperatures $M_s$ and $A_f$ are different from one another, as are the temperatures $M_f$ and $A_s$. The volume fraction of the martensitic phase in the shape-memory alloy is designated $\chi_m$.

Figure 2:
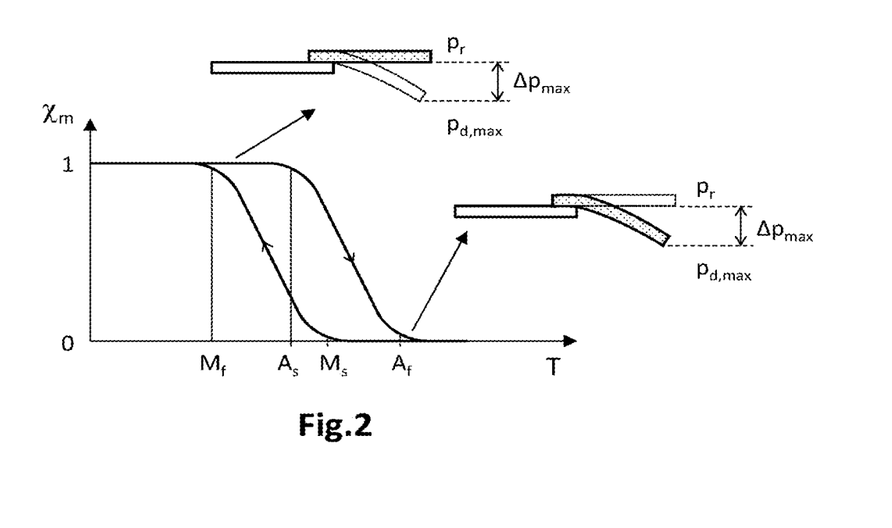
FIG. 2 is a graph illustrating the temperature variation of the volume fraction $\chi_m$ of the martensitic phase in a shape-memory alloy, as well as the deformation of a deformable part of an absorbent membrane.

Referring to FIG. 2, during an inverse martensitic transformation (from martensite to austenite), the volume fraction $\chi_m$ of the martensitic phase is initially greater than or equal to 0.95, or even equal to 1.0, when the temperature T of the shape-memory alloy is less than or equal to the temperature $A_s$. It then decreases as the temperature T increases, and is less than or equal to 0.05, or even equal to 0, when the temperature T is greater than or equal to the temperature $A_f$. Moreover, during the direct martensitic transformation (from austenite to martensite), the volume fraction $\chi_m$ of the martensitic phase is initially less than or equal to 0.05, or even equal to 0, when the temperature T of the shape-memory alloy is greater than or equal to the temperature $M_s$. It then increases as the temperature T decreases and is greater than or equal to 0.95, or even equal to 1.0, when the temperature T is less than or equal to the temperature $M_f$.

In other words, the deformable part has a first rest configuration in which the free end has a first position $p_r$. In this configuration, the deformable part is not deformed appreciably, and the temperature T of the deformable part is then less than or equal to the temperature A in the case of an inverse martensitic transformation (from martensite to austenite), or is less than or equal to the temperature $M_f$ in the case of a direct martensitic transformation (from austenite to martensite). Moreover, the deformable part, when it does not have the non-deformed rest configuration, occupies a deformed configuration in which the free end has at least one second position pa different from the position $p_r$. In this configuration, the deformable part is deformed towards the substrate, and the temperature of the deformable part is then above the temperature $A_s$ in the case of an inverse martensitic transformation (from martensite to austenite), or is above the temperature $M_f$ in the case of a direct martensitic transformation (from austenite to martensite).

The maximum travel of the deformable part defined between a first position $p_r$ of the free end in the rest configuration of the deformable part, and a second position $p_{d,max}$ of the free end in the deformed configuration when the temperature T is greater than or equal to the temperature $A_f$, is designated $\Delta p_{max}$. The positions $p_r$ and $p_{d,max}$ are defined along a Z axis orthogonal to the plane of the substrate. In the rest configuration, i.e. in the absence of excessive heating of the absorbent membrane, the free end of the deformable part is then spaced from the substrate by a maximum value $d_{max}$ less than or equal to the maximum travel $\Delta p_{max}$.

In the context of the invention, the shape-memory alloy of the deformable part has an austenite start temperature $A_s$ starting from which its free end deforms and comes into contact with the substrate. In other words, the free end comes into contact with the substrate at a contact temperature $T_c$ above the austenite start temperature $A_s$. The contact temperature $T_c$ may be, indifferently, below, equal to or above the austenite finish temperature $A_f$.

Moreover, the shape-memory alloy is advantageously adapted so as to have a dynamic time constant $\Delta t_{dyn}$ associated with the deformation of the deformable part in response to cooling above the thermal time constant $\Delta t_{th}$ associated with its cooling when the free end is in contact with the substrate. In other words, as explained in detail hereunder, cooling during contact of the deformable part with the substrate causes a sudden temperature drop of the shape-memory alloy with the thermal time constant $\Delta t_{th}$. The shape-memory alloy then deforms, in response to this cooling phase, with the dynamic time constant $\Delta t_{dyn}$. Since $\Delta t_{dyn}$ is above $\Delta t_{th}$, the shape-memory alloy cools to at least the temperature $M_f$.

Figure 3A:
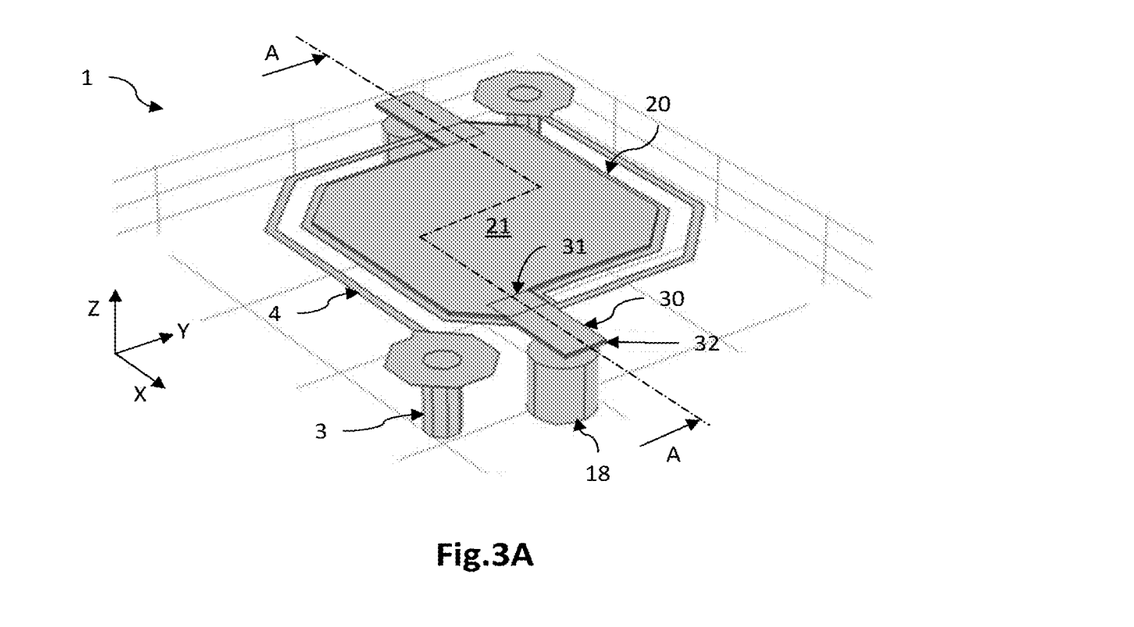
FIGS. 3A to 3C are schematic views, in perspective (FIG. 3A) and in section (FIG. 3B and FIG. 3C), of a detecting device according to one embodiment.
Figure 3B:
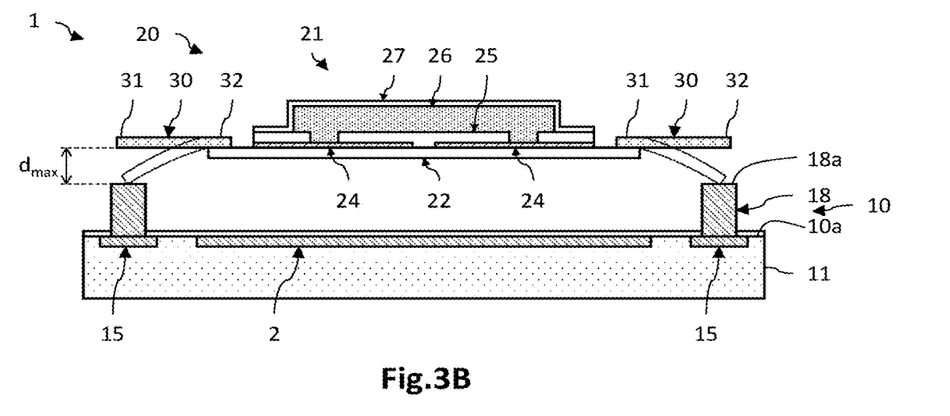
Figure 3C:
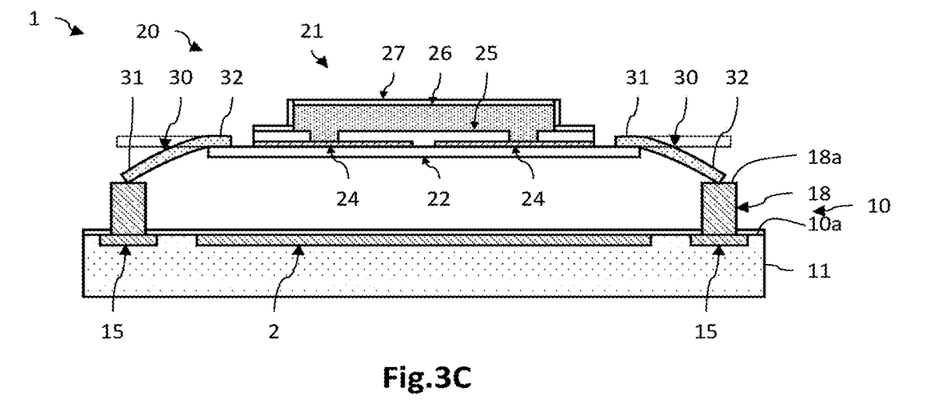

FIGS. 3A to 3C are schematic views, in perspective (FIG. 3A), and in section in the plane A-A (FIGS. 3B and 3C), of a detecting device according to one embodiment. A single thermal detector 1 is shown here, but the detecting device advantageously comprises a matrix of identical thermal detectors (sensitive pixels).

Here, and for the rest of the description, we define a direct three-dimensional orthogonal coordinate system (X,Y,Z), where the (X,Y) plane is approximately parallel to the principal plane of the reading substrate of the thermal detector 1, and where the Z axis is oriented in a direction approximately orthogonal to the principal plane of the reading substrate and oriented towards the absorbent membrane 20. In the rest of the description, the terms "lower" and "upper" are to be understood as relative to an increasing positioning on moving away from the reading substrate 10 in the +Z direction.

The thermal detector 1 comprises a substrate 10, advantageously functionalized, the so-called reading substrate, made in this example on the basis of silicon, comprising a reading circuit for controlling and reading the thermal detectors. Here, the reading circuit is in the form of a CMOS integrated circuit located in a supporting substrate 11. It comprises portions of conductors, for example metallic, separated from one another by a dielectric material, for example a mineral material based on silicon such as a silicon oxide $SiO_x$, a silicon nitride $SiN_x$, or alloys thereof. It may also comprise active electronic elements (not shown), for example diodes, transistors, or passive electronic elements, for example capacitors, resistances etc., connected by electrical interconnections to the thermal detector 1 on the one hand, and to a connecting pad (not shown) on the other hand, the latter being intended to connect the detecting device 1 to an external electronic device. As an illustration, the conductive portions and the conducting vias may be made, for example, of copper, aluminium or tungsten. The copper or tungsten may optionally be located between sublayers of titanium nitride, tantalum nitride or others. Here, the reading substrate 10 has an upper face formed notably by a surface of an inter-metal insulating layer and a surface of conductive portions of the last level of electrical interconnection. The substrate 10 is generally a stack. This stack 10 comprises the supporting substrate 11, and advantageously the reflector 2 and the protective layer 17. It may also comprise a contact pad 18, as described in detail hereunder, in which case the contact pad 18 is in thermal contact with the supporting substrate 11. Be that as it may, the deformable part 30 is intended to come into contact with the stack 10, for example in contact with the contact pad 18 of the stack 10.

The thermal detector 1 comprises a reflector 2, made of at least one material that is reflective with respect to the electromagnetic radiation to be detected. Here it is advantageously formed from a portion of the conductor of the last level of electrical interconnection of the CMOS integrated circuit. Moreover, here the substrate comprises two contact pads 18, which rest on conductive portions 15 of the last level of electrical interconnection, and are intended to form a contact surface 18a for the deformable parts 30 of the absorbent membrane 20. These contact pads 18 extend along the Z axis starting from the upper face boa of the substrate 10, and are made of at least one heat-conducting material, for example a metallic material, so that the supporting substrate bb and the contact pads 18 have a roughly identical temperature. Each contact pad 18 is intended to be located opposite, i.e. perpendicular to a deformable part 30, so that the free end 32 of the latter can come into contact with the contact pad 18. Thus, the substrate 10 (or stack 10) comprises an upper face boa as well as a contact surface 18a. Thus, when there is contact between the free end 32 of the deformable part 30 and the substrate 10, there is contact at the level of the upper face boa or of the contact surface 18a.

The upper face 10a is advantageously covered with a protective layer 17, notably when the thermal detector 1 is produced using mineral sacrificial layers that are then removed by chemical attack in HF (hydrofluoric acid) acid medium. The protective layer 17 then has a function of stopping etching, and is therefore adapted to provide protection of the supporting substrate bb and of the inter-metal dielectric layers, when they are made of a mineral material, against HF chemical attack. This protective layer 17 thus forms a hermetic and chemically inert layer. It is electrically insulating to prevent any short-circuiting between the portions of metallic conductor. It may thus be made of alumina $Al_2O_3$, or of aluminium nitride or fluoride, or of intrinsic amorphous silicon. It may have a thickness between some tens and some hundreds of nanometres, for example between 10 nm and 500 nm, and preferably between 20 nm and 100 nm.

The thermal detector 1 may have lateral dimensions in the XY plane (called pixel pitch), of the order of from one to some tens of microns, for example equal to about 10 µm or even less. It comprises a membrane 20 that absorbs electromagnetic radiation, suspended above the reading substrate 10 by anchoring pillars 3 and connected to the reading circuit by the latter. Moreover, it is thermally insulated with respect to the reading substrate by heat-insulating arms 4 that extend between the anchoring pillars and the absorbent membrane 20.

The anchoring pillars 3 are conducting pads made of at least one electrically conducting material, which extend along the Z axis starting from the reading substrate 10 and as far as the absorbent membrane 20. They are in contact with the portions of conductors, and thus provide electrical connection of the absorbent membrane 20 to the reading circuit. The anchoring pillars 3 may be made, for example, of copper, aluminium or tungsten, optionally encapsulated in at least one protective sublayer of titanium nitride, or other. Here, the heat-insulating arms 4 extend approximately coplanar to the absorbent membrane 20, and are formed here from an electrically conducting layer allowing electrical connection of the absorbent membrane 20 to the reading circuit, advantageously encapsulated in two dielectric layers, lower and upper, which help to provide stiffening of the heat-insulating arms 4.

The absorbent membrane 20 comprises a detecting part 21 and a deformable thermal short-circuit part 30. The detecting part 21 is said to be fixed, as it is located at an approximately constant distance with respect to the substrate 10. It comprises an absorber, formed here by the polarization electrodes 24, and a thermometric transducer. In general, a thermometric transducer is an element having an electrical property that varies as it is heated, and may be, as here, a thermistor material 26 formed for example of vanadium or titanium oxide, or of amorphous silicon, or as a variant may be a capacitor formed by a pyroelectric or ferroelectric material, a diode (PN or PIN junction), or a field-effect transistor with a metal-oxide-semiconductor structure (MOSFET).

The detecting part 21 of the absorbent membrane 20 is spaced from the reading substrate 10, and in particular from the reflector 2, by a non-zero distance. This distance is preferably adjusted so as to form a quarter-wave interference cavity optimizing the absorption of the electromagnetic radiation to be detected by the absorbent membrane 20. The absorbent membrane 20 is spaced from the reading substrate 10, and more precisely from the reflector 2, by a distance typically between 1 µm and 5um, preferably 2 µm, when the thermal detector 1 is designed for detecting infrared radiation in the LWIR.

Here, the absorbent membrane 20 is formed conventionally, in the detecting part 21, from a stack of a lower dielectric layer 22 made of a dielectric material, two electrodes 24 electrically insulated from one another by a lateral spacing, an intermediate insulating layer 25 made of a dielectric material and covering the electrodes 24 and the lateral spacing, apart from in two apertures opening onto the electrodes, a thermistor material 26 such as amorphous silicon or a vanadium or titanium oxide. The thermistor material 26 is in contact with the two polarization electrodes 24 via the apertures. An upper protective layer 27 covers the thermistor material 26, notably to protect the thermistor material 26 during chemical attack with hydrofluoric acid carried out subsequently. Here, the absorber is formed by the polarization electrodes 24, which are made of at least one metallic material, for example titanium nitride.

The absorbent membrane 20 further comprises a deformable part 30 providing a thermal short-circuit between the absorbent membrane 20 and the substrate 10 before the temperature $T_m$ of the absorbent membrane 20 reaches or exceeds the predetermined protection temperature $T_{th}$ of the thermistor material 26. Here, the deformable part 30 is made of a strip having two opposite longitudinal ends: a fixed first end 31 assembled on the detecting part 21, and a second so-called free end 32, i.e. which is able to move along the Z axis. "Strip" means a portion of material having a surface defined by a length greater than its width and a thickness less than the width. Moreover, as mentioned above, it is considered that the temperature in the absorbent membrane 20, i.e. within the detecting part and thermal short-circuit part, is uniform to a first approximation.

Referring to FIG. 3B, the deformable part 30 is adapted to have the first so-called rest configuration for which the temperature $T_m$ of the absorbent membrane 20 is notably equal to a nominal temperature $T_n$ when the thermal detector 1 is not subjected to high-power electromagnetic radiation. The free end 32 then occupies the first position $p_r$ and its spacing d (here the maximum spacing $d_{max}$) with the upper surface 18a of the contact pad 18 is less than or equal to the maximum travel $\Delta p_{max}$.

Referring to FIG. 3C, the deformable part 30 is also adapted to have a second so-called thermal short-circuit configuration in which the free end 32 is in contact with the substrate 10, and here with the upper surface 18a of the contact pad 18. The temperature $T_m$ of the absorbent membrane 20 then corresponds to the contact temperature $T_c$ at the instant of mechanical contact with the substrate 10, and then decreases in a cooling phase. The free end 32 then occupies a position $p_c$ and its spacing d with the upper surface 18a of the contact pad 18 is zero.

The deformable part 30 is made of at least one shape-memory alloy. More precisely, the shape-memory alloy is a metal alloy selected from the alloys based on NiTi, based on copper Cu, or based on iron Fe. The metal alloy is selected in such a way that the austenite finish temperature $A_f$ is less than or equal to the predetermined temperature $T_{th}$ of protection of the thermometric transducer. This protection temperature depends on the type of thermometric transducer, and may be of the order of 100° C. to 350° C., for example 200° C. Thus, the metal alloy may be made of a binary compound NiTi with an atomic proportion of nickel and of titanium equal or not, or of a ternary compound NiTiA where the additional chemical element A may be iron Fe, copper Cu, zirconium Zr, hafnium Hf, platinum Pt, palladium Pd, tungsten W, gold Au, or others. It may thus be $Ti_{51}Ni_{38}Cu_{11}$ where the subscripts represent the atomic proportion of each chemical element in the alloy. The thickness of the shape-memory alloy may be between some tens of nanometres to some hundreds of nanometres, for example 100 nm. The strip of the deformable part 30 may have a length of several microns, for example equal to between 1 and 2 μm and a width equal to some hundreds of nanometres or some microns, for example equal to between 50 nm and 2 μm. The deformable part may thus be a strip formed continuously of at least one material based on a shape-memory alloy, or may be formed of nanowires based on shape-memory alloy, having for example a width of some tens of nanometres, for example 50 nm. In this case, a deformable part based on nanowires makes it possible to reduce further the heat capacity of the absorbent membrane and obtain a larger maximum travel $\Delta p_{max}$.

The shape-memory alloy of the deformable part 30 advantageously comprises a plurality of projecting features (cf. FIG. 6J) oriented towards the contact surface 18a of the substrate 10. These features are protuberances that extend orthogonally to the strip that forms the deformable part 30. They make it possible to obtain, almost systematically, deformation of the deformable part 30 towards the contact surface. These projecting features may have a height for example of the order of some tens of nanometres.

The deformable part 30 is positioned with respect to the contact surface 18a of the substrate 10 (here the upper surface of the contact pad 18) in such a way that it deforms starting from the austenite start temperature A and touches the contact surface 18a at the contact temperature $T_c$, the latter being indifferently lower, equal to, or above the austenite finish temperature $A_f$. Thus, contact between the free end 32 of the deformable part 30 and the contact surface 18a of the substrate m is reflected in cooling of the absorbent membrane 20 and therefore a decrease of the temperature $T_m$. However, owing to temperature hysteresis of the martensitic transformation, here direct, the free end 32 of the deformable part 30 remains in contact with the contact surface 18a of the substrate 10 while the temperature $T_m$ remains above the martensite start temperature $M_s$.

Advantageously, and as described in detail hereunder, it may also remain temporarily in contact with the contact surface 18a of the substrate 10 for a temperature below the temperature $M_s$ owing to non-zero inertia of the dynamic deformation response of the shape-memory alloy. For this, the shape-memory alloy of the deformable part advantageously has a low hysteresis, i.e. a small difference between the temperatures $M_s$ and $A_f$, for example less than or equal to 20° C. The shape-memory alloy is then preferably selected from the alloys based on TiNiPd, TiNiCuAlMn, TiNiMn). When the temperature $T_m$ becomes less than or equal to $M_s$, there is loss of contact between the free end 32 and the contact surface 18a of the substrate 10. The deformable part 30 leaves the short-circuit configuration and tends towards its rest configuration.

In this example, the contact surface 18a of the substrate 10 is the upper surface of the contact pads 18 each located opposite a deformable part 30. It may also be a zone of the protective layer 17 if applicable, or a zone of the upper face ma of the substrate 10. Be that as it may, the maximum spacing $d_{max}$ between the free end 32 in the rest configuration and the contact surface 18a of the substrate 10 is selected so as to be less than or equal to the maximum travel $\Delta p_{max}$ of the shape-memory alloy. Thus, the vertical dimensioning of the contact pad 18 makes it possible to ensure that mechanical and therefore thermal contact between the free end 32 of the deformable part 30 on the contact pad 18 is effectively achieved at a contact temperature $T_c$ above the austenite start temperature $A_s$.

The operation of the detecting device is now described with reference to FIGS. 5A-5D, as opposed to FIGS. 4A-4C which illustrate operation of a detecting device according to the example in FIG. 1B from the prior art mentioned above.

Figure 4A:
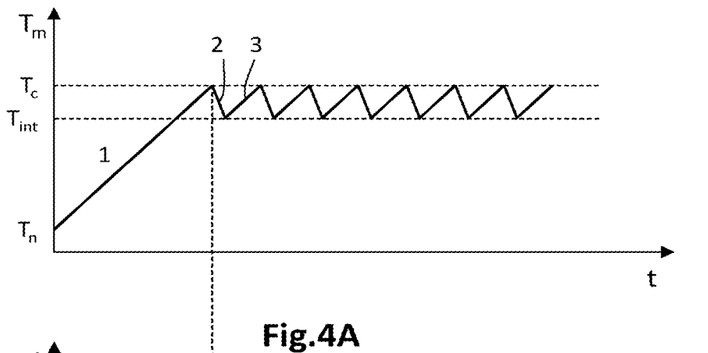
FIGS. 4A to 4C are graphs which illustrate, in the case of the thermal detector of the prior art illustrated in FIG. 1B, examples:
of temporal variation of the temperature $T_m$ of the absorbent membrane (FIG. 4A),
of temporal variation of the spacing d of the deformable part with respect to the substrate (FIG. 4B), and
of temperature variation of the spacing d of the deformable part (FIG. 4C)
Figure 4B:
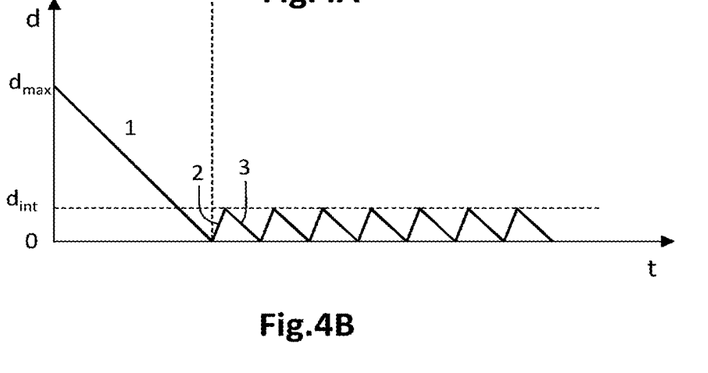
Figure 4C:
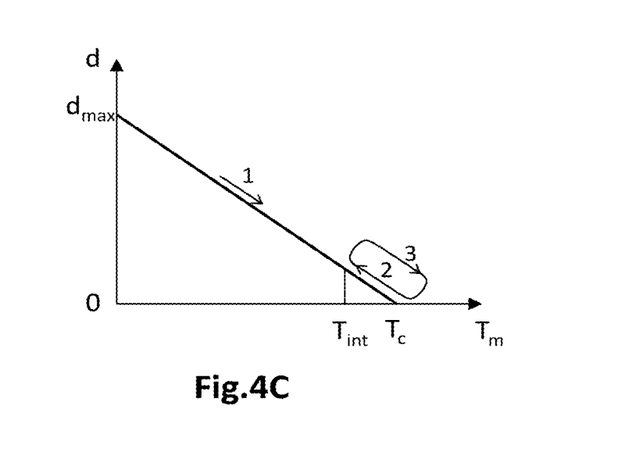

Referring to FIGS. 4A to 4C, it can be seen that a thermal detector 1 according to the prior art described above whose deformable part 30 is of the bimetal type has a continuous movement of vertical oscillation owing to alternation of the phases of cooling in contact with the substrate and heating after loss of contact. This continuous movement of vertical oscillation is characterized notably by mechanical contacts of short duration between the free end 32 and the contact surface 18a of the substrate 10, as well as by a low amplitude of oscillation.

Before the thermal detector 1 is subjected to high-power electromagnetic radiation, the temperature $T_m$ is approximately equal to the nominal temperature $T_n$. Then, a phase 1 of heating of the absorbent membrane 20 takes place starting from the moment when it is subjected to high-power electromagnetic radiation. The temperature $T_m$ increases continuously (rectilinear increase here, purely for purposes of illustration), and the deformable part 30 then deforms in consequence, so that the spacing d between the free end 32 and the substrate 10 decreases continuously starting from the value of maximum spacing $d_{max}$, down to zero. When there is mechanical contact between the free end 32 and the contact surface 18a of the substrate 10, the spacing d is then zero and the temperature $T_m$ corresponds to the contact temperature $T_c$.

When the deformable part 30 is in contact with the substrate, there is then a phase 2 of cooling of the absorbent membrane 20, which is reflected in a decrease of the temperature $T_{11}$, of the absorbent membrane 20 and in consequence a loss of contact of the free end 32 with respect to the substrate and an increase in the spacing d.

However, as the thermal detector 1 is still subject to high-power electromagnetic radiation, and the thermal contact with the substrate is broken, the temperature $T_m$ of the membrane increases again. This new phase of heating is then designated "3" in the figures. The temperature $T_m$ of the absorbent membrane 20 then increases and in consequence the free end 32 of the deformable part 30 goes back down, starting from a distance $d_{int}$, until it comes into contact with the substrate again (d=0).

It then appears that a continuous movement of vertical oscillation of the deformable part 30 develops, corresponding to alternation between the phases of contact and of cooling 2 and the phases of loss of contact and of heating 3. This continuous movement of vertical oscillation is of low amplitude since the variation of the spacing d is directly linked to the temperature variation. Thus, the temperature $T_m$ of the absorbent membrane 20 remains maintained at an increased average temperature between an intermediate temperature $T_{int}$ and the contact temperature $T_c$. It follows that this continuous movement of vertical oscillation may be detrimental to the properties of the deformable part 30 and therefore to that of the absorbent membrane 20, and may lead to accelerated ageing of the absorbent membrane 20. Moreover, the quality of thermal contact between the deformable part 30 and the substrate is low, since the mechanical contacts are of very short duration. Moreover, this may be reflected in non-uniformity of the thermal management of the different thermal detectors within one and the same matrix of sensitive pixels. These various aspects may lead to degradation of the performance of the detecting device.

Figure 5A:
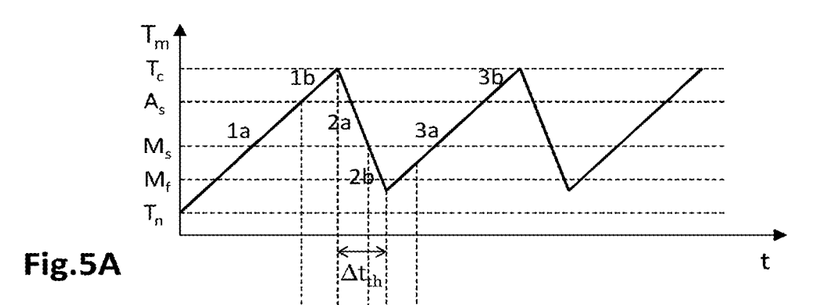
FIGS. 5A to 5D are graphs which illustrate, in the case of the thermal detector according to the embodiment illustrated in FIGS. 3A to 3C, examples:
of temporal variation of the temperature $T_m$ of the absorbent membrane (FIG. 5A),
of temporal variation of the spacing d of the deformable part with respect to the substrate (FIG. 5B), and
of temperature variations of the spacing d of the deformable part (FIGS. 5C and 5D)
Figure 5B:
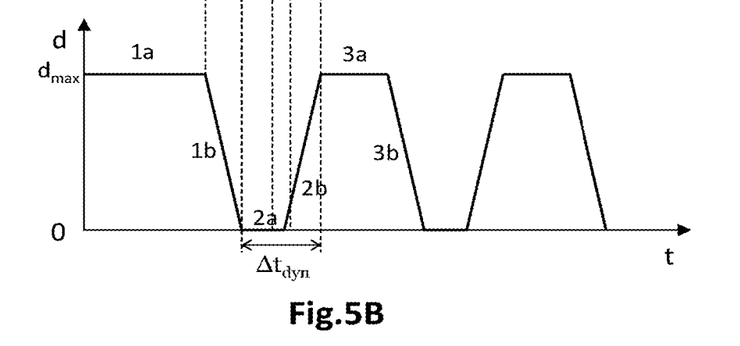
Figure 5C:
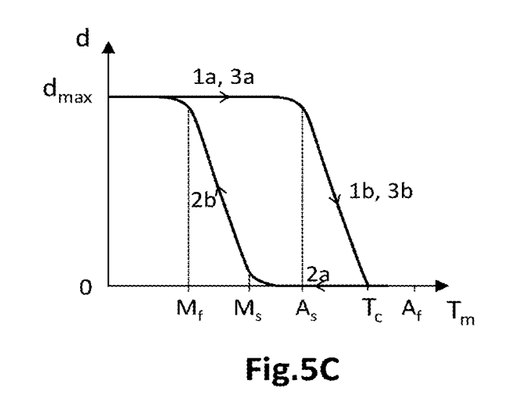

Referring to FIGS. 5A to 5C, it can be seen that the thermal detector 1 whose absorbent membrane 20 comprises a deformable part 30 with shape-memory alloy does not have this continuous movement of vertical oscillation. Mechanical contact between the deformable part 30 and the substrate is of longer duration and the amplitude of the vertical movement of the deformable part 30 is greater, thus improving the quality of the thermal contact and therefore of cooling of the absorbent membrane 20, which helps to preserve the performance of the detecting device.

As stated above, the temperature $T_m$ of the absorbent membrane 20 initially has a nominal temperature $T_n$ in the absence of high-power electromagnetic radiation. When this radiation is present (phase 1 of heating), the temperature $T_m$ of the absorbent membrane 20 increases continuously. All the while it is below the austenite start temperature $A_s$, the deformable part 30 does not deform and the spacing d remains equal to the maximum value $d_{max}$: this is part 1a. When the temperature $T_m$ reaches and exceeds the temperature $A_s$, the shape-memory alloy gradually passes from the martensitic phase to the austenitic phase, and deforms in consequence as the temperature $T_m$ increases, being reflected in a gradual decrease of the spacing d: part 1b. The temperature $T_m$ increases (and the spacing d decreases) until the free end 32 touches the substrate. At this instant, the spacing d is then zero and the temperature $T_m$ corresponds to the contact temperature $T_c$. Here, the temperature $T_c$ is below the temperature $A_f$, but as a variant it could be greater than or equal to $A_f$.

Owing to temperature hysteresis, the cooling (phase 2) of the absorbent membrane 20 owing to the thermal contact between the deformable part 30 and the substrate is not reflected immediately in loss of mechanical contact. In fact, phase 2 of cooling comprises a first part 2a in which the temperature $T_m$ of the deformable part 30 decreases without deforming until it reaches the martensite start temperature $M_s$. This temperature hysteresis of the direct martensitic transformation (from austenitic phase to martensitic phase) makes it possible to keep the free end 32 in contact with the substrate for a longer time than in the example from the prior art. Then, during a second part 2b of the cooling phase 2, the shape-memory alloy cools until it reaches, in this example, the martensite finish temperature $M_f$ since the dynamic time constant $\Delta t_{dyn}$ is greater than the thermal time constant $\Delta t_{th}$. As indicated in FIGS. 5A and 5B, the thermal time constant $\Delta t_{th}$ corresponds to the time required for the shape-memory alloy to pass from the contact temperature $T_c$ to a minimum temperature (here just below the martensite finish temperature $M_f$) owing to the cooling of the absorbent membrane 20. Moreover, the dynamic time constant $\Delta t_{dyn}$ corresponds to the time required for the shape-memory alloy to pass from zero spacing to maximum spacing dm, owing to the cooling of the absorbent membrane 20.

However, as the thermal detector 1 is still subject to high-power electromagnetic radiation, and the thermal contact with the substrate has been broken, the temperature $T_m$ of the membrane increases again. During this new heating phase 3, the deformable part 30 does not deform immediately, as in the example from the prior art. In fact, owing to the temperature hysteresis of the inverse martensitic transformation (from martensite to austenite), this phase 3 has a part 3a in which the spacing d remains constant at the maximum value $d_{max}$ all the while the temperature $T_m$ has not reached the austenite start temperature $A_s$. Then, in a part 3b, the temperature $T_m$ continues to increase and the spacing d decreases until there is thermal contact between the free end 32 and the substrate, at a temperature $T_c$, here below the temperature $A_f$ (but could be greater than or equal to $A_f$).

Figure 5D:
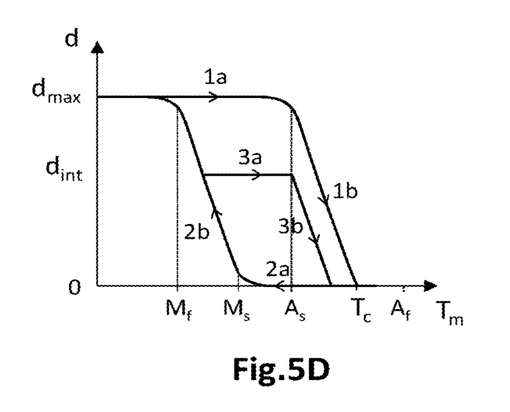

FIG. 5D illustrates a variant in which the thermal time constant $\Delta t_{th}$ is greater than the dynamic time constant $\Delta t_{dyn}$. Thus, during cooling (phase 2b), the temperature $T_m$ decreases but does not reach the temperature $M_f$ owing to the heating associated with the high-power electromagnetic radiation. Once again, owing to the temperature hysteresis of the inverse martensitic transformation, the heating phase comprises a part 3a in which the spacing d remains constant at an intermediate value $d_{int}$ all the while the temperature $T_m$ has not reached the austenite start temperature $A_s$. Then, in a part 3b, the temperature $T_m$ continues to increase and the spacing d decreases from $d_{int}$ until there is thermal contact between the free end 32 and the substrate (d=0) at a temperature $T_c$.

Thus, it follows that the temperature hysteresis of the direct martensitic transformation of the shape-memory alloy (from the austenitic phase to the martensitic phase) makes it possible to improve the quality of mechanical and therefore thermal contact between the deformable part 30 and the substrate. In fact, the free end 32 remains in contact with the substrate for a longer time, which improves the cooling of the absorbent membrane 20. Moreover, hysteresis of the martensitic transformation (direct and inverse) makes it possible to prevent development of a continuous movement of vertical oscillation with mechanical contacts of short duration between the deformable part 30 and the substrate. The risks of degradation of the properties of the absorbent membrane 20 are then reduced. We thus increase the reliability and the uniformity of thermal management of the various thermal detectors within one and the same matrix of sensitive pixels. The performance of the detecting device is thus improved.

FIGS. 6A to 6J illustrate different steps of a method for fabricating a thermal detector 1 according to one embodiment. In this example, the thermal detector 1 is made using mineral sacrificial layers intended to be removed subsequently by wet etching in acid medium (HF vapour). As a variant, the sacrificial layers may be produced on the basis of polyimide or equivalent and may be removed subsequently by dry etching for example under $O_2$ plasma. In this case, the materials of the different protective layers are adapted to be inert to this type of dry etching, and may be selected from MN, Al$_2$O$_3$, amorphous carbon, amorphous silicon, among others.

Figure 6A:
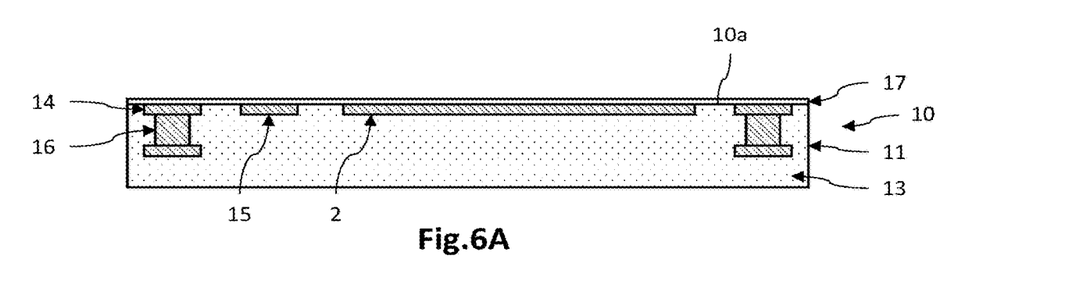
FIGS. 6A to 6J illustrate different steps of a method for fabricating the detecting device according to the embodiment illustrated in FIGS. 3A to 3C.

Referring to FIG. 6A, the reading substrate 10 is produced, formed from a supporting substrate 11 containing the reading circuit adapted for controlling and reading the thermal detector 1. The reading circuit thus comprises conductive portions 14 that are flush with the upper face 10a of the reading substrate 10, which is approximately flat. The conductive portions 14 and the conducting vias 16 may be made of copper, aluminium and/or tungsten, among others, for example by a damascene process, in which trenches made in the inter-metal insulating layer are filled. The conductive portions 16 may be made flush with the level of the upper face by a technique of chemical mechanical planarization (CMP).

The reflector 2 of the thermal detector 1 is also produced. Here, the reflector 2 is formed by a portion of a conductor of the last level of interconnection, the latter being made of a metallic material adapted to reflect the electromagnetic radiation to be detected. It is intended to extend opposite the absorbent membrane, and is intended to form, with the absorber, a quarter-wave interference cavity with respect to the electromagnetic radiation to be detected.

A conductive portion 15 intended to provide support and better thermalization of a contact pad of the substrate 10 may also be produced. This contact pad is intended to provide thermal contact between the substrate 10 and the deformable part of the absorbent membrane. Here, the conductive portion 15 is also formed from a portion of the conductor of the last level of interconnection.

A protective layer 17 may then be deposited so as to cover the inter-metal insulating layer 13. This etching barrier layer 17 is made of a material that is substantially inert to the etchant used subsequently for removing the mineral sacrificial layers, for example with the HF medium in the vapour phase. It thus prevents the underlying mineral insulating layers being etched during this step of removing the sacrificial layers. It may be formed of an aluminium oxide or nitride, aluminium trifluoride, or intrinsic amorphous silicon (not intentionally doped). It may be deposited for example by PVD (physical vapour deposition) and may have a thickness of the order of about ten nanometres to some hundreds of nanometres.

Figure 6B:
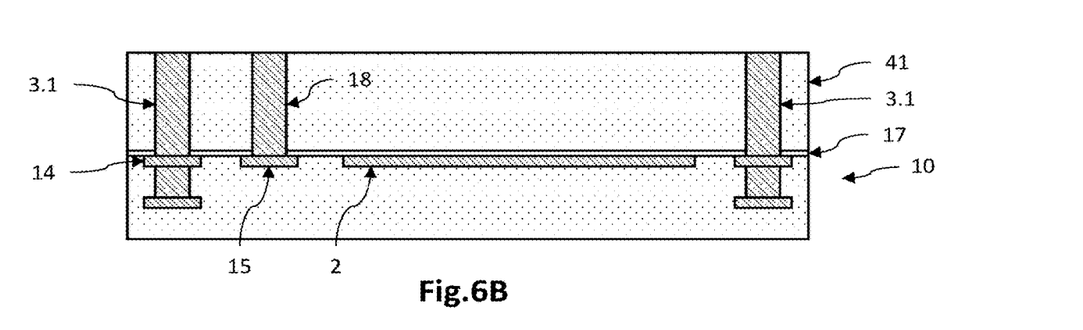

Referring to FIG. 6B, a part 3.1 of the anchoring pillars 3 as well as the contact pad 18 are produced. For this, a first sacrificial layer 41 is deposited on the reading substrate 10, for example made of a mineral material such as a silicon oxide SiO$_x$ deposited by plasma-enhanced chemical vapour deposition (PECVD). This mineral material can be removed by wet chemical etching, in particular by chemical attack in an acid medium, the etchant preferably being hydrofluoric acid (HF) in the vapour phase. This mineral sacrificial layer 41 is deposited in such a way that it extends continuously over substantially the whole surface of the reading substrate 10 and thus covers the etching barrier layer 17. The thickness of the sacrificial layer 41 along the Z axis makes it possible to define the height of the contact pad 18. It may be of the order of some hundreds of nanometres to some microns.

Vertical apertures intended to form the first parts 30.1 of the anchoring pillars 3 and to form the contact pad 18 are then made. They are made by photolithography and etching, and pass through the first mineral sacrificial layer 41 and the protective layer 17, to open onto the conductive portions 14 of the reading circuit, and here on the conductive portion 15. The vertical apertures may have a cross-section in the (X,Y) plane of square, rectangular, or circular shape, with an area approximately equal for example to 0.25 μm$^2$. The first parts 3.1 of the anchoring pillars 3 are then produced, as well as the contact pad 18 in the vertical apertures. They may be produced by filling the apertures with one or more electrically conducting materials. As an example, they may each comprise a layer of TiN deposited by PVD or MOCVD (metal organic chemical vapour deposition) on the vertical flanks of the apertures, and a core of copper or tungsten filling the space delimited transversely by the layer of TiN. A step of CMP then makes it possible to remove the excess filling materials and planarize the upper face formed by the sacrificial layer 41, the first parts 30.1 of the anchoring pillars 3 and the contact pad 18.

Figure 6C:
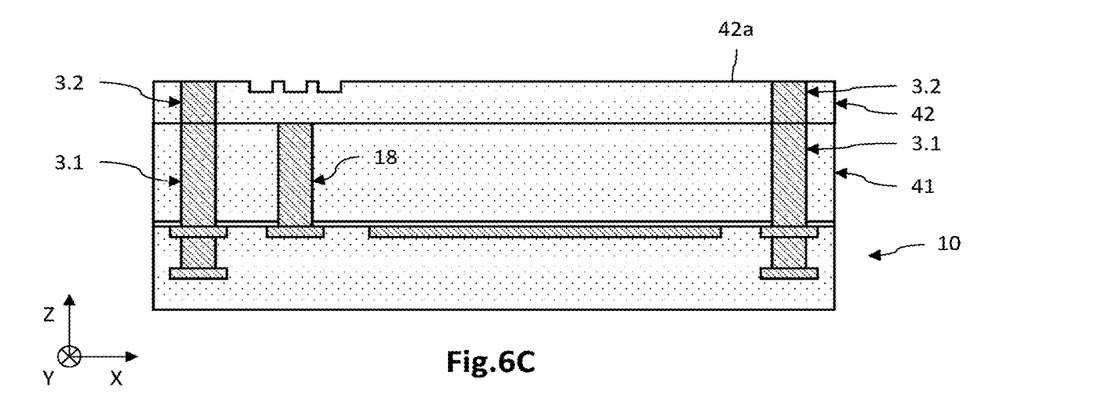

Referring to FIG. 6C, formation of the anchoring pillars 3 is finalized. For this, a second sacrificial layer 42 is deposited on the sacrificial layer 41, for example made of a mineral material identical to that of the sacrificial layer 41. Then vertical apertures are made, intended for forming the second parts 30.2 of the anchoring pillars 3. These vertical apertures are therefore positioned so that they only open onto the first parts 30.1 of the anchoring pillars 3. Then the second parts 30.2 of the anchoring pillars 3 are produced in the vertical apertures, for example made by filling the apertures with one or more electrically conducting materials identical to those of the first parts 3.1. A step of CMP then makes it possible to remove the excess filling materials and planarize the upper face formed by the sacrificial layer 42 and the anchoring pillars 3.

Preferably, partial local structuring (not passing through) of the sacrificial layer 42 opposite the contact pad 18 is carried out, starting from the upper face 42a. This local structuring is intended to obtain subsequently a layer 33 of shape-memory alloy having projecting features 34 oriented towards the contact surface 18a of the substrate 10. These projecting features 34 allow deformation of the deformable part 30 towards the contact surface 18 of the substrate 10 to be obtained more systematically.

Figure 6D:
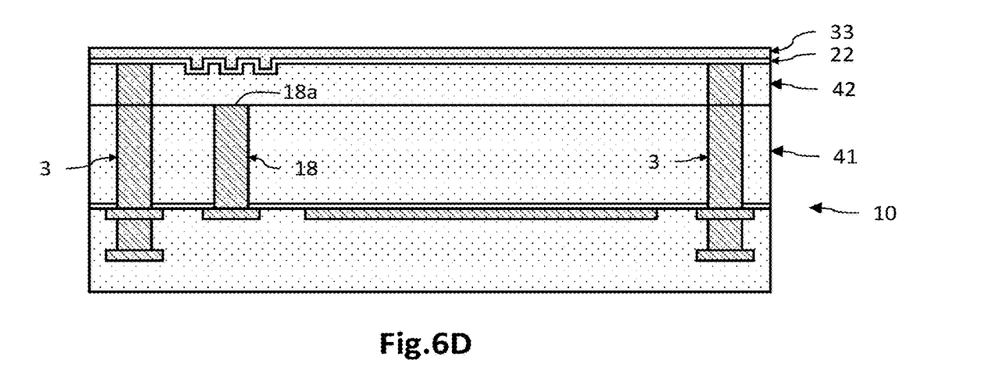

Referring to FIG. 6D, a lower dielectric layer 22 is deposited, covering the upper face of the second sacrificial layer 42. It thus extends over the flat zone of the upper face as well as in the partial local structurings, but without filling them. The lower dielectric layer 22 may be made of amorphous silicon, silicon carbide, alumina Al$_2$O$_3$ or aluminium nitride, among others. It may have a thickness of some tens of nanometres, for example 20 nm, and helps to provide stiffening of the heat-insulating arms. Then a layer 33 of shape-memory alloy is deposited, so as to cover the lower dielectric layer 22 and fill the partial local structurings. The layer 33 may have a thickness of some tens to hundreds of nanometres, for example between 10 nm and 900 nm.

The shape-memory alloy may be a metal alloy of NiTi whose atomic proportion of nickel and titanium, as well as of optional additional chemical elements, gives an austenite finish temperature $A_f$ below a threshold temperature of protection $T_{th}$. The shape-memory alloy may thus be, for example, Ti$_{85.3-x}$Ni$_x$Hf$_{14.7}$ with x>$_{50}$% in at %, Ti$_{82-x}$Ni$_x$Zr$_{18}$ with x>49% in at %, Ti$_7$Ni$_{11}$Zr$_{43}$Cu$_{39-x}$Co$_x$ with x>10% in at %, Ti$_{50}$Ni$_{50-x}$Pt$_x$ with x<25% in at %, Ti$_{50.5}$Ni$_{24.5}$Pd$_{25}$, Ti$_{51}$Ni$_{38}$Cu$_{11}$, Ti$_{50-x}$Ni$_{50}$Cu$_x$ with x>$_{7.5}$% in at %, TiNiCuAlMn, CuAlNi, TiNiMn, among others. It may also be TiTa, TiNiPd, TiNiHf, TiNiZr, TiNiZrCuCo, CoAl, which have the advantage of having a transformation time constant (and therefore a dynamic time constant $\Delta t_{dyn}$) likely to be greater than the thermal time constant $\Delta t_{th}$.

Figure 6E:
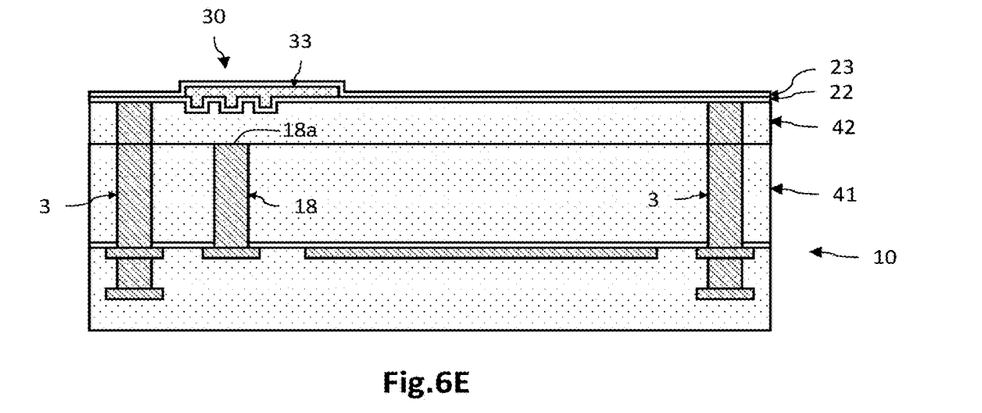

Referring to FIG. 6E, the deformable part 30 is made by local structuring of the layer 33 of shape-memory alloy.

Thus, a strip is obtained with a length for example of the order of 1 to 2 µm, and with a width for example between 0.3 and 2 µm. Then a first intermediate dielectric layer 23 is deposited, for example made of a material identical to that of the lower dielectric layer 22, and with a thickness of some tens of nanometres, so as to cover the lower dielectric layer 22 as well as the strip 33 of shape-memory alloy of the deformable part 30.

Figure 6F:
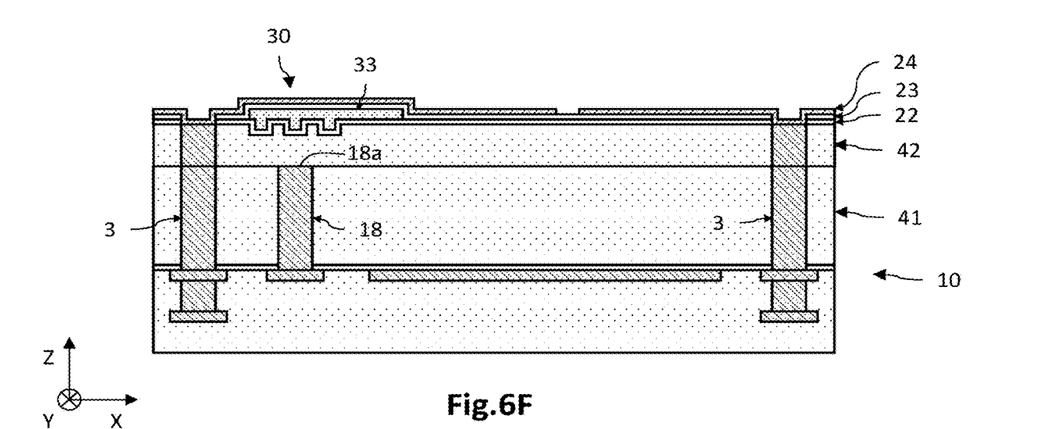

Referring to FIG. 6F, the dielectric layers 22, 23 are etched locally so as to form apertures opening onto the anchoring pillars 3, and then a conductive layer 24 is deposited so as to cover the intermediate dielectric layer 23 and to come into contact with the anchoring pillars 3 through the apertures. The conductive layer 24 is therefore in contact with the upper end of the anchoring pillars 3 and is intended to provide electrical polarization of the thermistor material. It is made of an electrically conducting material, for example TiN with a thickness of some nanometres to some tens of nanometres, for example 10 nm. The conductive layer 24 is then etched locally so as to form a lateral spacing between two portions of the conductive layer 24 intended to form the polarization electrodes.

Figure 6G:
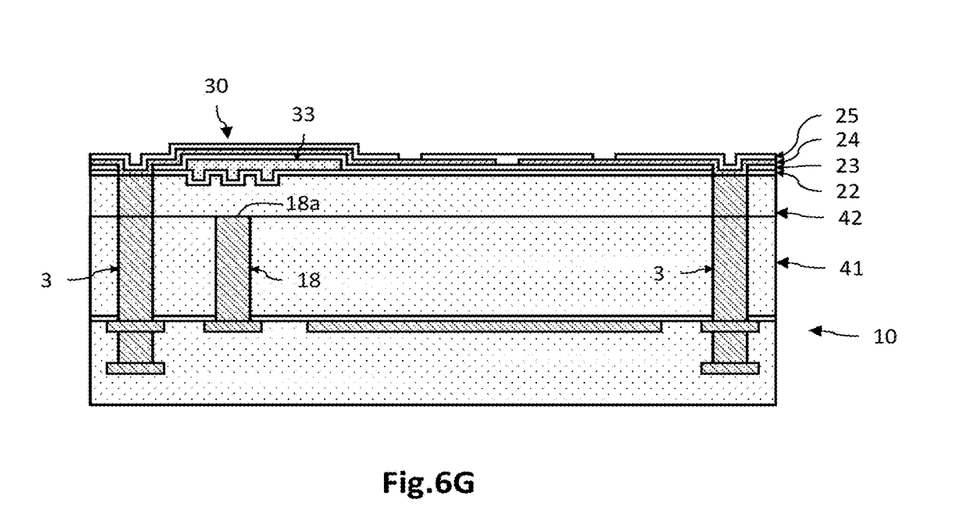

Referring to FIG. 6G, then a second intermediate dielectric layer 25 is deposited so as to cover the conductive layer 24 and to come into contact with the underlying intermediate dielectric layer 23 through the lateral spacing between the two polarization electrodes 24. It is preferably made of a dielectric material identical to that of the underlying dielectric layers and has a thickness for example between some tens to hundreds of nanometres. Then the intermediate dielectric layer 25 is etched locally so as to form two apertures opening onto the polarization electrodes 24.

Figure 6H:
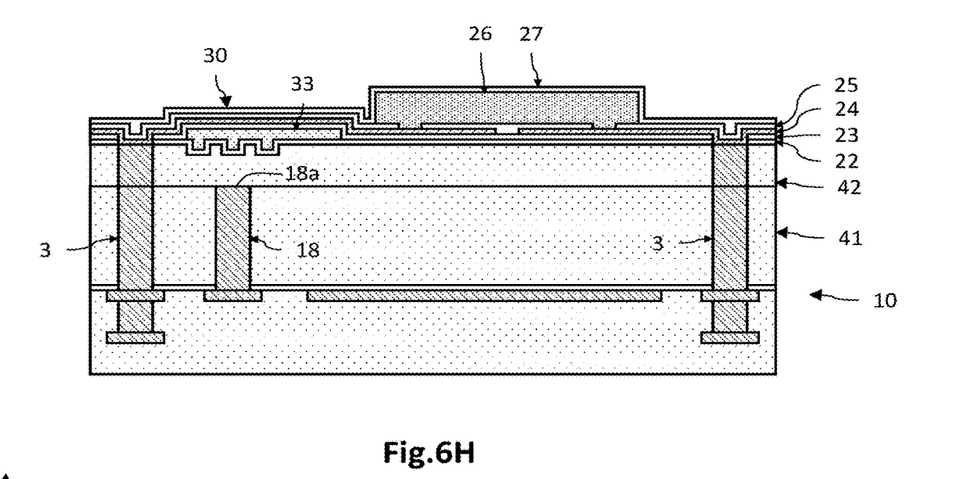

Referring to FIG. 6H, the thermistor material 26 is then deposited, for example of amorphous silicon or of a vanadium or titanium oxide, in electrical contact with the polarization electrodes 24 via the apertures. It may have a thickness for example between 20 nm and 200 nm. Finally, an upper protective layer 27, for example of amorphous silicon, $Al_2O_3$ or AlN with a thickness between 10 nm and 50 nm, is deposited so as to cover the thermistor material 26.

Figure 6I:
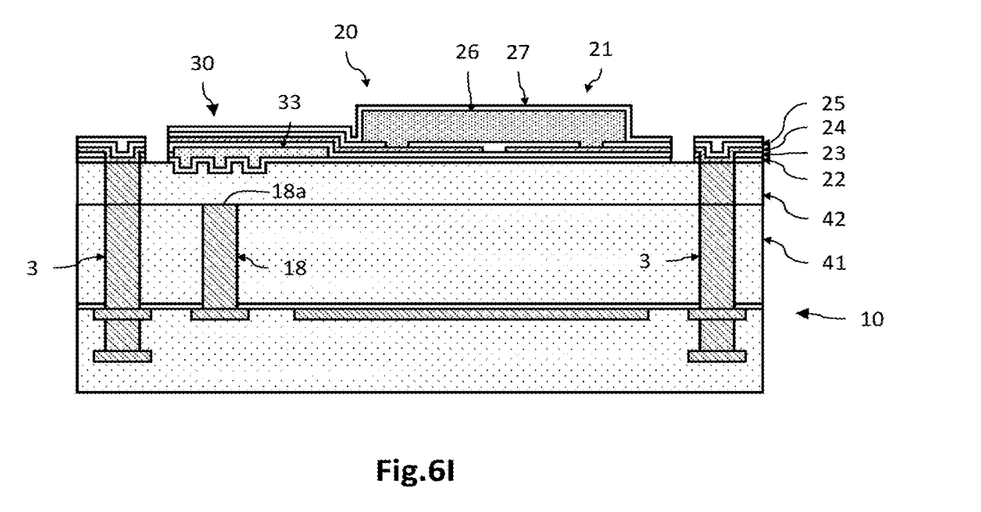

Referring to FIG. 6I, the stack of dielectric layers 22, 23, 25, 27 and the conductive layer 24 are etched locally so as to form the heat-insulating arms as well as the absorbent membrane 20.

Figure 6J:
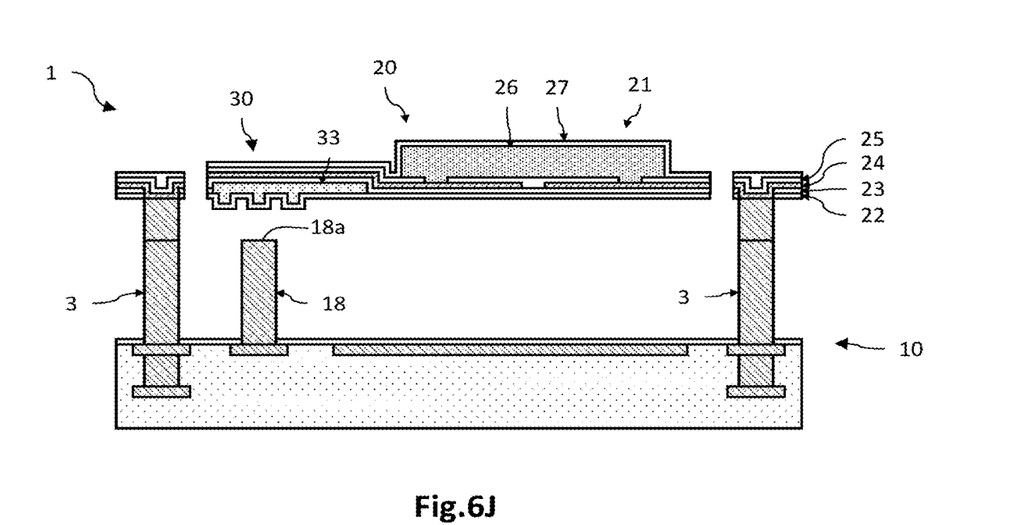

Referring to FIG. 6J, the various sacrificial layers are removed so as to suspend the absorbent membrane 20 above the reading substrate. Removal may be carried out after encapsulating the thermal detector 1 in a casing (not shown) defining a cavity under vacuum, intended to be hermetic. Suspension may be obtained by chemical etching of the various mineral sacrificial layers, here by wet chemical etching by attack with hydrofluoric acid in the vapour phase.

A detecting device is thus obtained whose absorbent membrane 20 of the thermal detector 1 comprises a deformable part 30 based on shape-memory alloy. The deformable part 30 is positioned with respect to the contact surface 18a of the substrate 10 in such a way that the maximum spacing $d_{max}$ is less than or equal to the maximum travel $\Delta p_{max}$ of the shape-memory alloy. Thus, during considerable heating of the absorbent membrane 20 owing to high-power electromagnetic radiation, the deformable part 30 deforms towards the substrate starting from the temperature $A_s$, and here from the contact pad, and will come into contact with the latter at a temperature $T_c$. Thus, owing to the temperature hysteresis of the direct martensitic transformation (from the austenitic phase to the martensitic phase), a thermal contact of good quality is obtained between the deformable part 30 and the substrate (here the contact pad), improving the reliability of cooling of the absorbent membrane 20.

Owing to the temperature hysteresis of the inverse martensitic transformation (from the martensitic phase to the austenitic phase), development of a continuous movement of vertical oscillation with mechanical contacts of short duration of the deformable part 30 on the substrate is thus prevented. The cooling of the absorbent membrane 20 is thus made more effective, having a longer duration and a larger amplitude.

Moreover, when the shape-memory alloy has a dynamic time constant $\Delta t_{dyn}$ greater than the thermal time constant $\Delta t_{th}$ associated with the cooling of the absorbent membrane 20, the shape-memory alloy passes, during cooling of the absorbent membrane 20 in response to thermal contact with the substrate, from the austenitic phase ($\chi_m \leq 0.05$) to the martensitic phase ($\chi_m \geq 0.95$), and therefore passes to a temperature less than or equal to the martensite finish temperature $M_f$.

Particular embodiments have just been described. Several variants and modifications will be apparent to a person skilled in the art.

Figure 7A:
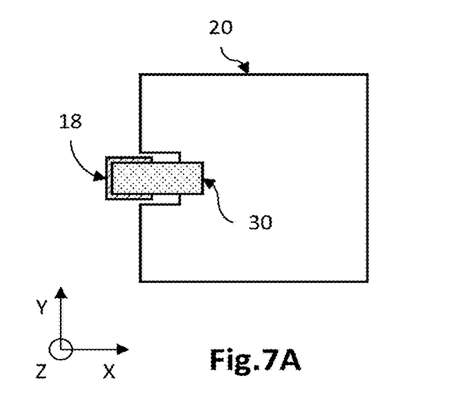
FIGS. 7A to 7D are schematic sectional/top views of various thermal detectors according to variant embodiments.

Thus, as illustrated schematically in FIG. 7A in top view, the deformable part 30 may be located near a vertex of the absorbent membrane 20 in the XY plane, or, as here, at the centre of a side of the absorbent membrane 20. The latter may have a cut-out in the XY plane in which the deformable part 30 is located, thus making it possible to reduce the fill factor associated with the sensitive pixel, i.e. the ratio of the area of the absorbent membrane 20 (here with its deformable part 30) to the total area of the sensitive pixel, in the XY plane.

Figure 7B:
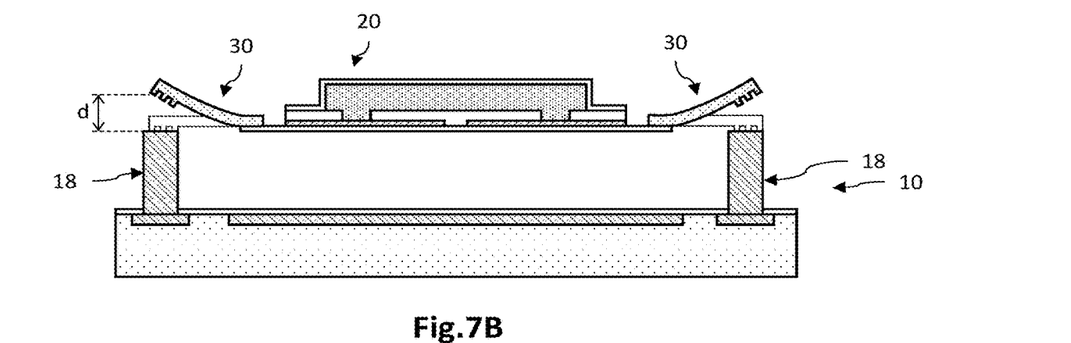

Moreover, as illustrated schematically in FIG. 7B in sectional view, the deformable part 30 may have an upward-curved shape (in the +Z direction) in its rest configuration (low temperature) and an approximately flat shape as shown in the thermal short-circuit configuration, or a downward-curved shape (in the −Z direction).

Figure 7C:
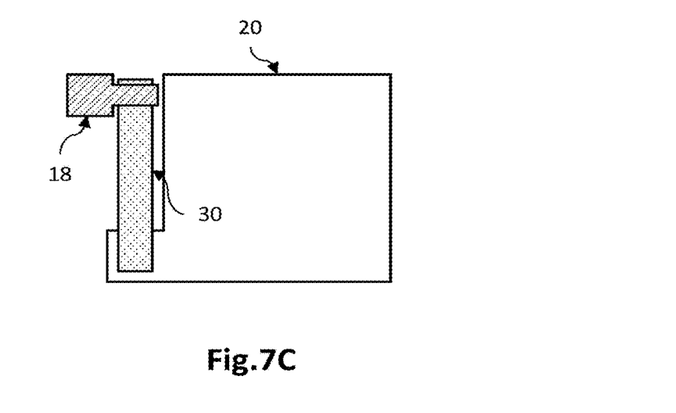
Figure 7D:
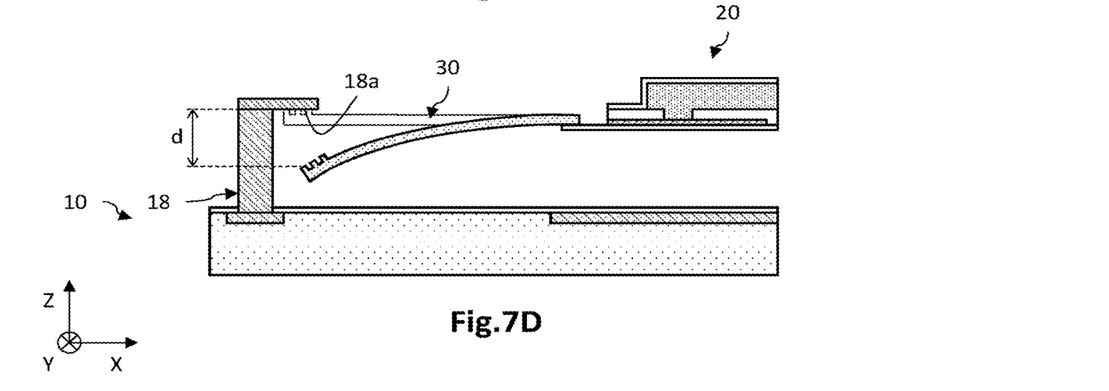

Moreover, as illustrated schematically in FIG. 7C in top view and in FIG. 7D in sectional view, the deformable part 30 may have a downward-curved shape (in the −Z direction) in the rest configuration, and an approximately flat shape as shown in the thermal short-circuit configuration, or an upward-curved shape. In this case, the contact pad 18 has a projecting portion in the XY plane providing a contact surface 18a with respect to the deformable part 30.

The invention claimed is:

1. A thermal detector configured to detect electromagnetic radiation, comprising:
   a substrate;
   a membrane that absorbs electromagnetic radiation, thermally insulated with respect to the substrate, and comprising:
   a fixed detecting part comprising a thermometric transducer,
   a deformable thermal short-circuit part,
      comprising a fixed end assembled to the fixed detecting part, and an opposite free end,
      configured to deform under the effect of a temperature change of the absorbent membrane, so that the free end of the deformable part comes into contact with the substrate at a contact temperature $T_c$ of the absorbent membrane;
   wherein the deformable part:
   comprises a shape-memory alloy having an inverse martensitic transformation of a martensitic phase into an austenitic phase of said alloy between austenite start $A_s$ and austenite finish $A_f$ temperatures, and a direct martensitic transformation of the austenitic phase into the martensitic phase between martensite start $M_s$ and martensite finish $M_f$ temperatures, the austenite finish temperature $A_f$ being above the martensite start temperature $M_s$, and is arranged with respect to the substrate in such a way that the free end is in contact with the substrate at the contact temperature $T_c$ above the austenite start temperature $A_s$.

2. The thermal detector according to claim 1, wherein the deformable part:

has a maximum travel $\Delta p_{max}$ between a first position $p_r$ of the free end for a temperature $T_m$ of the absorbent membrane less than or equal to the martensite finish temperature $M_f$, and a second position $p_{d,max}$ of the free end corresponding to a temperature $T_m$ greater than or equal to the austenite finish temperature $A_f$, and is positioned with respect to the substrate in such a way that a maximum distance $d_{max}$ separating the free end occupying the first position $p_r$ and a contact surface of the substrate on which the free end is in contact at the contact temperature $T_c$ is less than or equal to the maximum travel $\Delta p_{max}$.

3. The thermal detector according to claim 1, wherein the shape-memory alloy is a metal alloy based on NiTi.

4. The thermal detector according to claim 1, wherein the shape-memory alloy is a metal alloy selected from $Ti_{50.5}Ni_{24.5}Pd_{25}$, $Ti_{85.3-x}Ni_xHf_{14.7}$ with x>50 at %, and $Ti_7Ni_{11}Zr_{43}Cu_{39-x}Co_x$ with x>10 at %.

5. The thermal detector according to claim 1, wherein the substrate has a contact surface on which the free end is in contact at the contact temperature $T_c$, and in which the shape-memory alloy is in the form of a longitudinal strip between the fixed end and the free end, one face of which, oriented towards the contact surface of the substrate, has projecting features.

6. The thermal detector according to claim 1, wherein the substrate has a flat upper face, and comprises a contact pad that extends from the upper face and has a contact surface on which the free end is in contact at the contact temperature $T_c$.

7. The thermal detector according to claim 6, wherein the contact pad is made of at least one heat-conducting material identical to that of the anchoring pillars.

8. The thermal detector according to claim 1, wherein the substrate has a flat upper face, and in which the absorbent membrane is held above the upper face of the substrate by heat-insulating arms, and by anchoring pillars that extend approximately orthogonally to the plane of the upper face of the substrate.

9. A method for fabricating the thermal detector according to claim 1, comprising the following steps:

supplying a substrate having a contact surface;

depositing at least one sacrificial layer;

making anchoring pillars through the sacrificial layer;

making heat-insulating arms and an absorbent membrane on the sacrificial layer, the absorbent membrane comprising a deformable part located opposite the contact surface;

removing the sacrificial layer.

* * * * *